(12) United States Patent
Cannon

(10) Patent No.: US 8,684,655 B2
(45) Date of Patent: Apr. 1, 2014

(54) HAY SPEAR ACCESSORY APPARATUS

(76) Inventor: Ronald Douglas Cannon, Dunnellon, FL (US)

(*) Notice: Subject to any disclaimer, the term of this patent is extended or adjusted under 35 U.S.C. 154(b) by 793 days.

(21) Appl. No.: 12/831,769

(22) Filed: Jul. 7, 2010

(65) Prior Publication Data

US 2012/0009011 A1    Jan. 12, 2012

(51) Int. Cl.
*A01D 87/00* (2006.01)
*A01D 87/12* (2006.01)
*B66F 9/00* (2006.01)

(52) U.S. Cl.
USPC .......... 414/607; 414/24.5; 414/721; 414/724; 414/912; 414/920

(58) Field of Classification Search
USPC ........ 414/24.5, 24.6, 607, 724, 911, 912, 721
See application file for complete search history.

(56) References Cited

U.S. PATENT DOCUMENTS

| | | | |
|---|---|---|---|
| 2,569,978 A | 10/1951 | Dunlap | |
| 3,396,862 A * | 8/1968 | Fischer | 414/607 |
| 3,434,611 A * | 3/1969 | Ferrari | 414/621 |
| 3,561,628 A * | 2/1971 | Melin | 414/664 |
| 4,084,708 A * | 4/1978 | Goodvin | 414/24.6 |
| 4,329,103 A * | 5/1982 | Miller | 414/24.5 |
| 4,348,143 A | 9/1982 | Hedgespeth | |
| 4,422,621 A * | 12/1983 | Ekern | 254/30 |
| 5,261,642 A | 11/1993 | Stambaugh | |
| 5,316,427 A * | 5/1994 | DeLong et al. | 414/24.6 |
| 6,305,894 B1 | 10/2001 | Dearborn | |
| 6,840,730 B2 | 1/2005 | Noualy | |
| 2001/0041116 A1 | 11/2001 | Noualy | |
| 2008/0298931 A1* | 12/2008 | Horner | 414/24.5 |

* cited by examiner

*Primary Examiner* — Scott Lowe
(74) *Attorney, Agent, or Firm* — Massinger Law Office

(57) ABSTRACT

A hay spear accessory apparatus for providing a secure and fixed mounting point for attachments such as ropes, chains, cables and the like, the apparatus being generally comprised of a an open-ended sleeve member having an interior diameter sized for slidable engagement over the distal end of a hay spear, the sleeve having attachment mounting means fixedly connected to the outer surface thereof. The interior of the sleeve has a varied diameter so as to accommodate the receipt of hay spears of various diameters. The apparatus of the subject invention is designed for frictional engagement with a hay spear, but optional securing means are also provided which prevent axial displacement of the apparatus along the hay spear once mounted thereon.

14 Claims, 3 Drawing Sheets

HAY SPEAR ACCESSORY APPARATUS

FIELD OF THE INVENTION

The subject invention relates to hay spears generally, and to a removable accessory device therefore, in particular.

BACKGROUND OF THE INVENTION

A "hay spear" is a tractor mounted device for impaling and lifting hay bales and is typically comprised of a long, round, pencil-pointed shaft used to pierce the hay bale. The spear is typically constructed of carbon steel, stainless steel or aluminum, but may also be made of any material having suitable strength and durability for its intended use. As illustrated in U.S. Pat. No. 4,120,405 issued to Jones et al. in 1978, a hay spear may be mounted to any ordinary hydraulically operated front end loader, or to any common three-point tractor hitch. Depending on the geographical location, a hay spear may also be referred to as a hay spike, tine, stabber or prong.

It is common practice to use a front end loader-mounted hay spear as a point of attachment for ropes, chains, cables, come-alongs and the like (hereinafter "attachments") which are then used for the lifting of objects (hereinafter "work piece"). One end of an attachment is secured to or around the work piece to be lifted and the other end of the attachment is tied or wrapped around the hay spear which is positioned horizontal or near horizontal to the ground. Thusly mounted, the work piece can be lifted from the ground or other resting surface by raising the loader and moved to another location if desired. A similar process is often employed for pulling fence posts from the ground.

A significant shortcoming of the above practices is that the hay spear has no practical mounting surface for the attachment. Accordingly, the attachment must be wrapped around the narrow cylindrical surface of the spear several times as tightly as possible. Because the surface is smooth in texture, attachments are highly prone to both radial and axial slippage, often becoming dislodged from the spear causing damage to the work piece and creating an extremely dangerous condition for the tractor operator and others in close proximity. Another frequently encountered problem with the above practices is that the attachment can slide axially in the direction of the tractor bringing the work piece in contact with the front of the tractor, potentially causing damage to both. Because a suspended work piece has freedom of movement, it is desirable to mount the attachment toward the distal or free-end of the spear as opposed to the proximal or "tractor-facing" end of the spear. Here again, even when the spear is oriented horizontally, axial slippage toward or away from the tractor is common particularly when the work piece is moved.

In view of the shortcomings and limitations of the prior art there has existed a longstanding need for an mounting apparatus adapted for removable attachment to a hay spear or other similarly shaped elongated member wherein the apparatus serves as a secure and fixed mounting point for attachments. The subject apparatus fulfils these objectives and others as set forth in greater detail herein.

SUMMARY OF THE INVENTION

The subject invention more specifically relates to a hay spear accessory apparatus that provides a secure and fixed mounting point for attachments, the apparatus being generally comprised of a an open-ended sleeve member, preferably of heavy gauge metal, having an interior diameter sized for slidable engagement over the distal end of a hay spear, the sleeve having attachment mounting means fixedly connected to the outer surface thereof. The interior of the sleeve has a varied diameter so as to accommodate the receipt of hay spears of various diameters. The apparatus of the subject invention is designed for frictional engagement with a hay spear, but optional securing means are also provided which prevent axial displacement of the apparatus along the hay spear once mounted thereon.

There has thus been outlined, rather broadly, the more important components and features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide a hay spear accessory apparatus that, when mounted, to a hay spear, provides a positive point of attachment for chains, ropes, cables and other attachments.

It is another primary object of the subject invention to provide a hay spear accessory apparatus that may be mounted to the tapered distal end of a hay spear.

Another object of the subject invention is to provide a hay spear accessory apparatus shaped and sized to come into frictional engagement with a hay spear thus requiring no mounting hardware.

Still another object of the subject invention is to provide a hay spear accessory apparatus strong enough to support heavily weighted work pieces therefrom.

It is also an object of the subject invention to provide a hay spear accessory apparatus that is comprised of relatively few components to facilitate easy assembly and use as well as reduce the chances of mechanical failure.

Another object of the subject invention is to provide a hay spear accessory apparatus which is relatively simple in design and therefore capable of rapid construction at relatively low costs.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
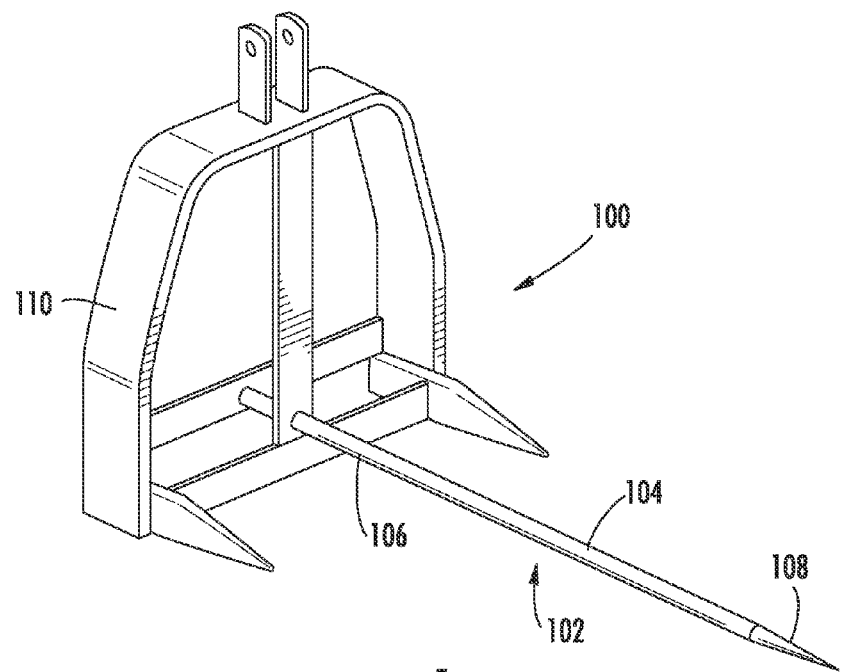
FIG. 1 is a side elevational view of a conventional hay spear assembly of the prior art shown mounted to a front end loader and three-point hitch of a tractor.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal" and "vertical" simply refer to the orientation of an object relative to level ground, and the terms "left", "right", "top" and "bottom", "up" and "down", as well as adjectival and adverbial derivatives thereof (e.g., "rightwardly", "upwardly", etc.), simply refer to the orientation of a surface relative to its axis of elongation, or axis of rotation as appropriate.

Figure 2:
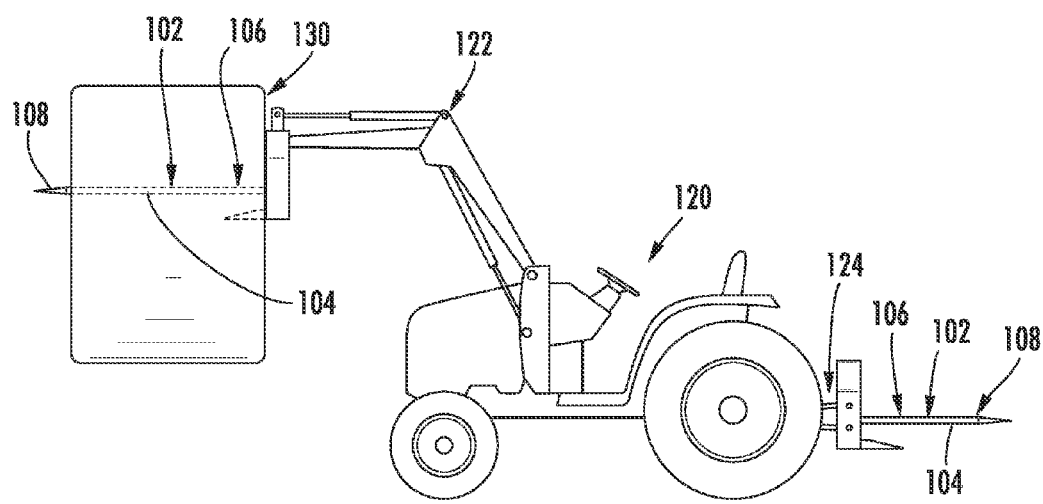
FIG. 2 is a perspective view of a typical hay spear assembly of the prior art.

Before the subject hay spear accessory apparatus is described it is first helpful to understand the construction and use of the device upon which it is mounted. Accordingly, reference is first made to FIG. 1 in which there is illustrated a typical hay spear assembly of the prior art designated generally by reference numeral 100. Hay spear assembly 100 is comprised of a hay spear 102 comprising an elongated shaft 104, round in cross section, and having a proximal end 106 and a pencil-pointed distal end 108. Proximal end 106 is fixedly attached to a frame 110 having means for mounting assembly 100 to a tractor or other work vehicle. More specifically, referring to FIG. 2, a conventional tractor 120 is shown having hydraulically operated front end loader mechanism 122 and three-point hitch 124. As may be appreciated, distal end 108 of hay spear 102 is used to pierce the hay bale 130 which is then supported on shaft 104. The spear is typically constructed of carbon steel, stainless steel or aluminum, but may also be made of any material having suitable strength and durability for its intended use.

Figure 3:
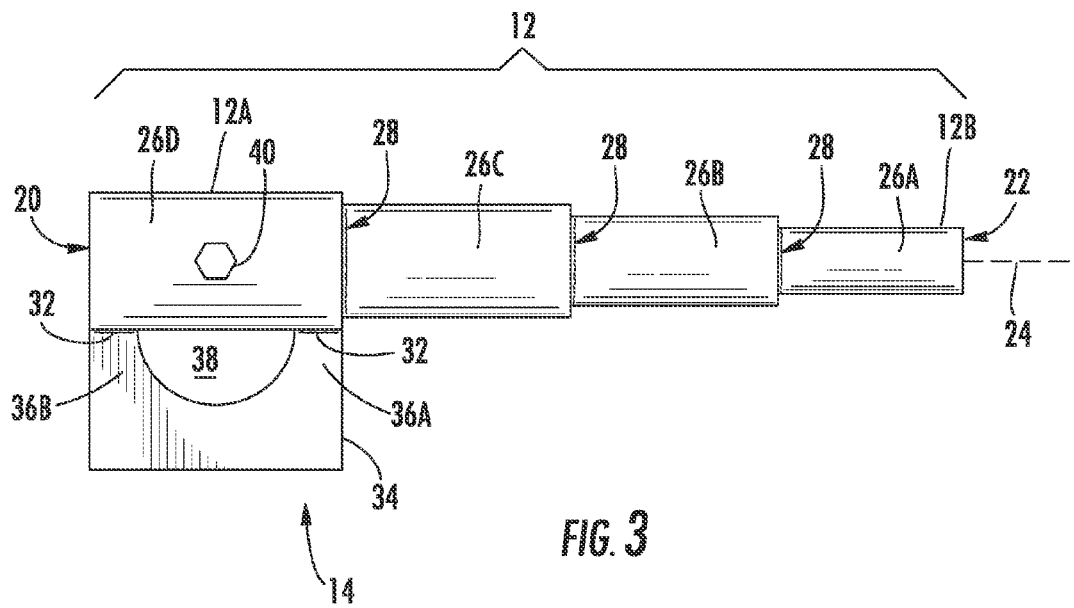
FIG. 3 is side elevational view of the hay spear accessory device of the subject invention.
Figure 4:
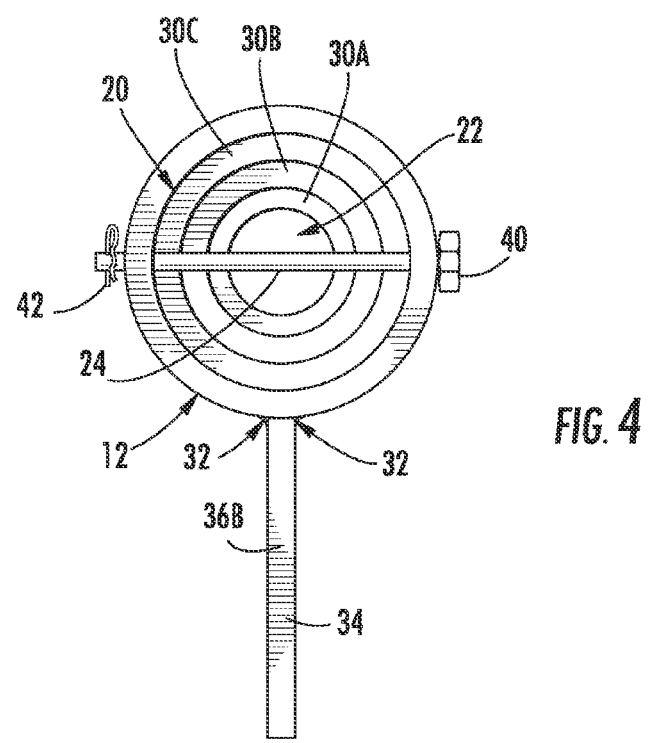
FIG. 4 is an end view of the hay spear accessory device of FIG. 3.
Figure 5:
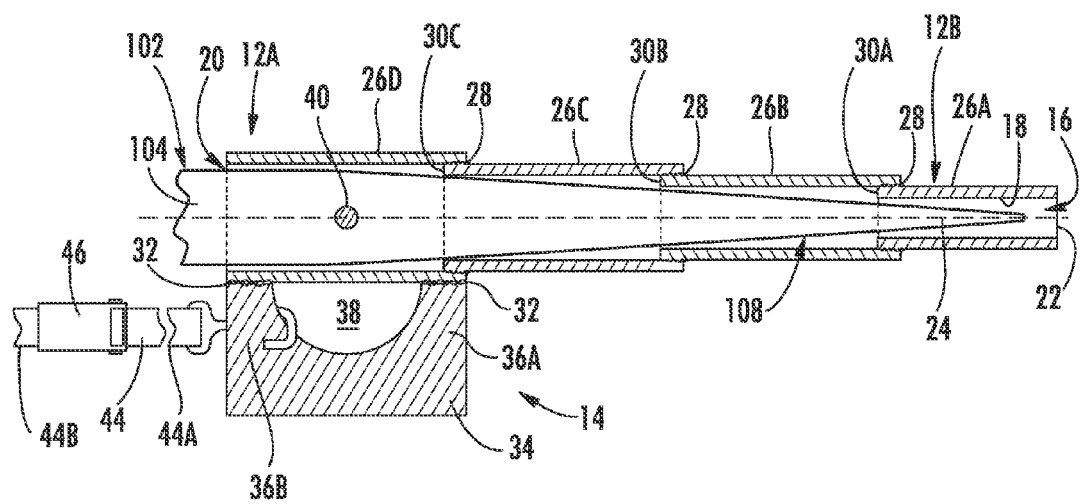
FIG. 5 is a side sectional view of the hay spear accessory device of the subject invention mounted on a hay spear.

Reference now being made to FIGS. 3 through 5, the subject hay spear accessory apparatus (hereinafter sometimes also referred to as simply "apparatus"), designated generally by reference numeral 10, is shown in side elevational, end and cross-sectional views respectively. In its broadest sense, the subject apparatus is a hay spear accessory apparatus capable of slidable engagement over the distal end 108 of a conventional hay spear, and is comprised of two primary components, namely an open-ended sleeve 12 and attachment mounting means 14 connected to sleeve 12. Both sleeve 12 and attachment mounting means 14 are preferably but not essentially constructed of heavy gauge metal or metal alloy, but may also be made of any other material having suitable strength and durability for the intended use of apparatus 10.

More specifically, sleeve 12 is a hollowed structure having a first end 12A and second end 12B at least one such end being open for the receipt of distal end 108 of a hay spear 102 within interior space 16 which is defined by interior wall 18 (FIG. 5). In a preferred embodiment, sleeve 12 includes two openings, namely a first opening 20 at first end 12A and second opening 22 at second end 12B. First opening 20 is sized to permit the slidable receipt therethrough of most conventional hay spears which typically have a shaft diameter of 3.5 inches or less. It should readily be appreciated, however, that the specific dimensions of apparatus 10 may be varied to accommodate hay spears of virtually any shape or dimension.

Referring in particular to FIG. 4, the cross-sectional shape of interior space 16 at any point along its longitudinal axis of rotation 24 is typically circular but may be of any shape capable of mating engagement with hay spear 102. Oval or polygonal cross-sectional shapes are also contemplated, for instance. Interior wall 18 is tapered downwardly from its larger first opening 20 at first end 12A to the relatively smaller second opening 22 at second end 12B. The taper may be continuous (not shown) producing a frustoconical shape or incremental in nature with the diameter of interior wall 18 changing in step-down fashion over the distance of its longitudinal axis of rotation 24. In general, the shape of at least a portion of interior wall 18 of sleeve 12 roughly conforms to the tapered distal end 108 of hay spear 102 so as to come into frictional engagement when mounted thereon. The exterior shape of sleeve 12 is not critical.

Sleeve 12 may be constructed of a plurality of separate parts which are coupled together to define interior space 16, or may be of unibody construction produced by casting, for instance. A preferred construction of sleeve 12 involves the mating of at least two cylindrical members in telescopic fashion. By way of example, and referring especially to FIG. 5, sleeve 12 is comprised of first sleeve member 26A partially inserted within a second sleeve member 26B which in turn is partially inserted within a third sleeve member 26C which in turn is partially inserted with a fourth sleeve member 26D. All sleeve members are fixed in position via circumferential welds 28. This preferred arrangement produces shoulders 30A-C along interior wall 18 at least one of which comes into frictional engagement with the tapered surface of distal end 108 of hay spear 102. Ideally, the sleeve member having the greatest interior diameter (in this case sleeve member 28D) will be positioned over a portion of shaft 104 (as opposed to tapered distal end 108) when apparatus 10 is mounted.

The second primary component of apparatus 10, namely attachment mounting means 14, depends from sleeve 12 and is permanently fixed thereto via weld(s) 32. Attachment mounting means 14 may be constructed in a wide variety of shapes and sizes capable of providing a fixed point of attachment for securing attachments such as chains, ropes, cables and the like to apparatus 10 generally. Moreover, although attachment mounting means 14 is shown depending radially from sleeve 12 and parallel to its axis of rotation 24, it should be appreciated that other points of attachment to sleeve 12 are also contemplated and within the scope of the subject invention. In a preferred embodiment, attachment mounting means 14 is comprised of a C-shaped plate 34 having first leg 36A and second leg 36B fixedly attached to the exterior surface of sleeve 12 such that plate 34 depends radially from sleeve 12. Such an arrangement produces an aperture 38 through which attachments may be inserted for mounting purposes. The provision of an aperture through which attachments may be inserted is a critical element of the subject invention. Although in the example described above, aperture 38 is defined by a combination of plate 34 and sleeve 12, it should be appreciated that aperture 38 may be present in plate 34 only.

Referring to FIG. 5, hay spear accessory apparatus 10 may include optional securing means for preventing axial and/or rotational displacement of the apparatus relative to the hay spear 102 over which it is mounted. Although friction between abutting surfaces of sleeve 12 and hay spear 102 is sufficient to prevent significant movement during operation, particularly when the distal end of hay spear 102 is horizontal or pointed upwardly, apparatus 10 may be secured to hay spear 102 in a variety of ways. In a first embodiment, securing means comprises a locking pin 40 inserted through holes (not shown) disposed transversely through the common axis of rotation of sleeve 12 and hay spear 102, and secured in place via cotter pin 42 in a manner well known in the art. Although this example of securing means prevents both axial and rotational movement of apparatus 10 relative to hay spear 102, it does require boring of a hole through the latter. Alternative "non-invasive" adjustable securing means is comprised of a conventional tie-down strap 44 having a first end 44A attached to apparatus 10 and a second end 44B attached to the frame 110 of hay spear assembly 100 (not shown in this illustration). A ratchet 46 or other suitable means for tightening strap 44 is also provided. Once tightened, apparatus 10 is prevented from moving axially along hay spear 102 and therefore is prevented from accidental dislocation.

Figure 6:
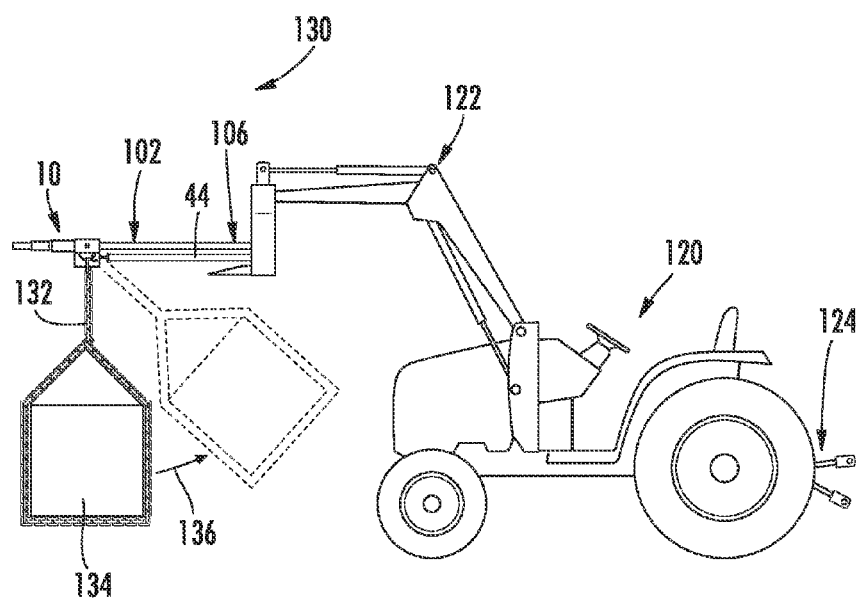
FIG. 6 is an illustration of the subject apparatus in operation.

Referring now to FIG. 6, the subject hay spear accessory apparatus 10 is shown mounted to a hay spear 102 which in turn is mounted to hay spear assembly 100 which in turn is mounted to a front end loader mechanism 122 of tractor 120. Note that attachment mounting means 14 faces downwardly of sleeve 10 and serves as a positive mounting point for chain 132 or other similar attachment. Note further that because of the tapered design of interior wall 16, apparatus 10 is prevented from sliding past distal end 108 of hay spear 102. The location of apparatus 10 away from proximal end 106 of hay spear 102 is necessary to permit work pieces 134 from coming into contact with the front of the work vehicle (in this case tractor 120) even if the work piece experiences swinging movement along radius 136 in the direction of tractor 120.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. A hay spear accessory apparatus for providing a mounting point for chains, ropes, cables and come-alongs, the apparatus comprising:
    a) an open-ended sleeve for mounting to the tapered distal end of a hay spear; said sleeve having an inner wall shaped to frictionally engage only the tapered distal end of a hay spear to prevent said sleeve from travel along the spear shaft; and
    b) attachment mounting means depending radially from said sleeve and parallel to its longitudinal axis.

2. The hay spear accessory apparatus of claim 1, wherein said attachment mounting means is comprised of a plate having an aperture.

3. The hay spear accessory apparatus of claim 2, wherein said shape of said inner wall includes at least one shoulder sized for said frictional engagement with a portion of said tapered distal end of said hay spear.

4. The hay spear accessory apparatus of claim 2, further including tightening, means for biasing said sleeve against said tapered distal end of said hay spear thus preventing axial dislocation of said sleeve from said hay spear.

5. The hay spear accessory apparatus of claim 1, wherein said shape of said inner wall includes at least one shoulder sized for said frictional engagement with a portion of said tapered distal end of said hay spear.

6. The hay spear accessory apparatus of claim 5, further including tightening means for biasing said sleeve against said tapered distal end of said hay spear thus preventing axial dislocation of said sleeve from said hay spear.

7. The hay spear accessory apparatus of claim 1, wherein said shape of said inner wall includes at least one shoulder sized for said frictional engagement with a portion of said tapered distal end of said hay spear.

8. The hay spear accessory apparatus of claim 1 further including tightening means for biasing said sleeve against said tapered distal end of said hay spear thus preventing axial dislocation of said sleeve from said hay spear.

9. An apparatus for providing a mounting point for chains, ropes, cables and come-alongs, said accessory apparatus to be used in combination with a hay spear comprising an elongated shaft, round in cross section, and having a proximal end and a pencil-pointed distal end, said accessory apparatus being comprised of:
    a) an open-ended sleeve for mounting to the tapered distal end of a hay spear; said sleeve having an inner wall shaped to frictionally engage only the tapered distal end of a hay spear to prevent said sleeve from travel along the spear shaft; and
    b) attachment mounting means depending radially from said sleeve and parallel to its longitudinal axis.

10. The hay spear accessory apparatus of claim 9, wherein said attachment mounting means is comprised of a plate having an aperture.

11. The hay spear accessory apparatus of claim 10, further including tightening means for biasing said sleeve against said tapered distal end of said hay spear thus preventing axial dislocation of said sleeve from said hay spear.

12. The hay spear accessory apparatus of claim 9, wherein said shape of said inner wall includes at least one shoulder sized for said frictional engagement with a portion of aid tapered distal end of said hay spear.

13. The hay spear accessory apparatus of claim 12, further including tightening means for biasing said sleeve against said tapered distal end of said hay spear thus preventing axial dislocation of said sleeve from said hay spear.

14. The hay spear accessory apparatus of claim 9, further including tightening means for biasing said sleeve against said tapered distal end of said hay spear thus preventing axial dislocation of said sleeve from said hay spear.

* * * * *